(12) United States Patent
Innes

(10) Patent No.: US 6,687,743 B1
(45) Date of Patent: Feb. 3, 2004

(54) CLIENT SERVER COMMUNICATIONS FOR A MOBILE COMPUTING DEVICE

(75) Inventor: Brian Innes, Ferndown (GB)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 09/614,029

(22) Filed: Jul. 11, 2000

(30) Foreign Application Priority Data

Feb. 24, 2000 (GB) .............................................. 0004331

(51) Int. Cl.[7] .............................................. G06F 15/16
(52) U.S. Cl. ........................ 709/206; 709/248; 709/227; 709/230
(58) Field of Search ................................. 709/206, 203, 709/230, 227, 248; 379/215.01; 455/445

(56) References Cited

U.S. PATENT DOCUMENTS 6,219,694 B1 * 4/2001 Lazaridis et al. ........... 709/206
6,389,115 B1 * 5/2002 Swistock .................. 379/88.12
6,424,841 B1 * 7/2002 Gustafsson ................. 455/466
6,456,616 B1 * 9/2002 Rantanen .................... 370/352
6,560,456 B1 * 5/2003 Lohtia et al. ............... 455/445

* cited by examiner

Primary Examiner—Mehmet B. Geckil
(74) Attorney, Agent, or Firm—Jerry W. Herndon (57) ABSTRACT

The invention relates to establishing a server initiated high-level protocol communications session between a server 10 and a client on a mobile computing device 70. The client supports a low-level protocol for both inbound and outbound calls but supports a high-level protocol for outbound calls only. The server initiates a first call to the client using the low-level protocol. Upon detecting this call, the client then initiates a second call to the server in order to establish the communications session.

28 Claims, 8 Drawing Sheets

CLIENT SERVER COMMUNICATIONS FOR A MOBILE COMPUTING DEVICE

FIELD OF THE INVENTION

The invention relates generally to client/server communications for mobile computing devices and in particular to server initiated high-level protocol communications with the client.

BACKGROUND OF THE INVENTION

Client/Server distributed computing environments are well known in the art. A central server system, comprising one or more servers, running a plurality of applications, is provided. Multiple client machines may connect to the system in order to retrieve data from one or more of its servers. The clients are physically separate from the server, running their own operating system. Clients typically communicate with the server system via an asynchronous connection using a standard comms protocol such as TCP/IP.

It is common for such a system to include a mail server running database application software with email capability such as Lotus Notes, available from the IBM Corporation. The mail server is responsible for receiving the electronic mail addressed to all users registered with it.

Typically the database software comprises a mail database including multiple mailboxes. Each registered user owns one of these mailboxes and mail arriving at the server is automatically deposited in the appropriate box. Each client machine runs software (eg Lotus Notes) allowing a user to access mail, work with it, and to compose their own emails. Such software may also provide added functionality, for example a calendar, an address book etc.

Some email programs such as Lotus Notes also allow each user to store a copy of their mail database on their local machine. A user manipulates their mail locally and only connects to the server in order to send and receive mail. Thus improved response times are observed. The software enabling a user to synchronise (ie replicate) their local database with the server's mailbox is generally part of the functionality of the email application itself (as with Lotus Notes).

The use of pervasive devices is on the increase. Such devices may include personal digital assistants (PDAs), palmtops, notepads etc. Such devices have no fixed connection to a server. Rather, they have to specifically dialup the server in order to communicate with the server, for example to synchronise their local copy of a mailbox with the corresponding mailbox held on the server. After such an operation the mobile device will then disconnect from the server.

These mobile computing devices also provide additional functionality. They can be used to connect into any service provider in order to receive data. For example, they can be used to browse the World Wide Web and download information. A travel agent may take and/or confirm a client's booking via a PDA. Share prices may be requested by and received at the client etc.

Such information is frequently transmitted from the server to the client by means of a high-level protocol (eg via a TCP/IP session). Establishing a TCP/IP session between a client and server is commonplace. However, many of these mobile computing devices only provide support for a low level protocol for inbound and outbound calls. They do not cater for high-level protocol inbound calls, and this has hitherto prevented server-initiation of any such high-level protocol communications session.

DISCLOSURE OF THE INVENTION

Accordingly, the present invention provides a method for establishing a server initiated high-level protocol communications session between a server and a client on a mobile computing device, wherein said mobile computing device supports a low-level protocol for both inbound and outbound calls, and a high-level protocol for outbound calls only, said method comprising the steps of: initiating a first call from said server to said client using the low-level protocol; responsive to detecting said first call at the client, initiating a second call from said client to said server; and responsive to receiving the second call at the server, establishing said communications session.

Such mobile computing devices (also known as pervasive devices), for example palmtops, notebooks, notepads, personal digital assistants (PDAs) and intelligent mobile phones, are becoming increasingly widespread, and are frequently used in a client server paradigm. However they have no fixed connection to a server, but rather a user typically has to specifically dialup as required. Such dial-up usually happens over a mobile telephone network (digital or analog). Hitherto it has been very difficult for the server to "push" information onto such mobile computing devices, but this is now greatly facilitated by the approach of the present invention.

Because of size and power limitations, many mobile computing devices are limited in their communications support. This support is typically incorporated into the operating system of the device (another reason for limiting the support to provide quick start-up and subsequent operation of the OS). Thus it is relatively common in such devices for the operating system to support a high level protocol such as TCP/IP for outbound calls, but not for inbound calls, for which instead only relatively low level protocols such as a simple serial link are supported natively. Since many server applications rely on high-level protocols such as TCP/IP, this has hitherto prevented such applications initiating communications with a remote mobile device.

(Note that "high" and low in this context reflect the support for functionality such as error checking, retries, etc. Note also that although the mobile device will typically support the low level protocol for both outbound and inbound calls, strictly speaking such low level protocol support is only necessary for inbound calls, not outbound calls, for the purposes of the present invention).

Thus in accordance with a preferred embodiment of the present invention, the server initiates communication with the client (a personal digital assistant) using a supported low-level protocol. Once this call has been received at the client, and it is detected that the call includes predetermined information, the first call is dropped, before initiating a second call. For this second call the client connects in to the server to establish a high-level protocol communications session. Information can subsequently be received from the server via this session.

Note that several variations on possible on the form and handling of the initial call from the server to the client. One possibility is to use SMS messaging, a feature of many mobile telephone networks, as the low level protocol. This is generally supported natively by many mobile devices. Another possibility is to use network communication protocols at the client as the low-level protocol to detect the caller id of the server. Thus if the first call is determined as originating from a particular server based on the caller id (whether or not the mobile device actually answers the call itself) this can then be used to trigger an outbound call back from the client to the server.

In the preferred embodiment, the server stores details of protocols supported by the client. Thus for any given communication with a client, the server can first check to see whether the client supports a desired high-level protocol for inbound calls, in which case the relevant communication session can be started directly. However, if the client does not support this protocol for inbound calls, the two-call approach of the present invention can be employed, with an initial call using a low-level protocol.

The invention further provides a server for initiating a high-level protocol communications session with a client on a mobile computing device, wherein said mobile computing device supports a low-level protocol for both inbound and outbound calls, and a high-level protocol for outbound calls only, comprising: means for initiating a first call to the client using the low-level protocol; means for receiving a second call from the client, wherein the initiation of said second call by the client is responsive to detecting said first call at the client; and means, responsive to receipt of said second call, for establishing said communications session, with the client using said high-level protocol.

The invention further provides a mobile computing device client for receiving data from a server via a high-level protocol communications session, wherein said device supports a low-level protocol for both inbound and outbound calls, and a high-level protocol for outbound calls only, said device comprising: means for receiving a first call from the server using the low-level protocol; means, responsive to receiving said first call, for initiating a second call to the server using the high-level protocol; and means for establishing said communications session with the server using said high-level protocol.

BRIEF DESCRIPTION OF THE DRAWINGS

A preferred embodiment of the present invention will now be described in detail, by way of example only, and with reference to the following drawings.

DESCRIPTION OF THE PREFERRED EMBODIMENTS

Figure 1:
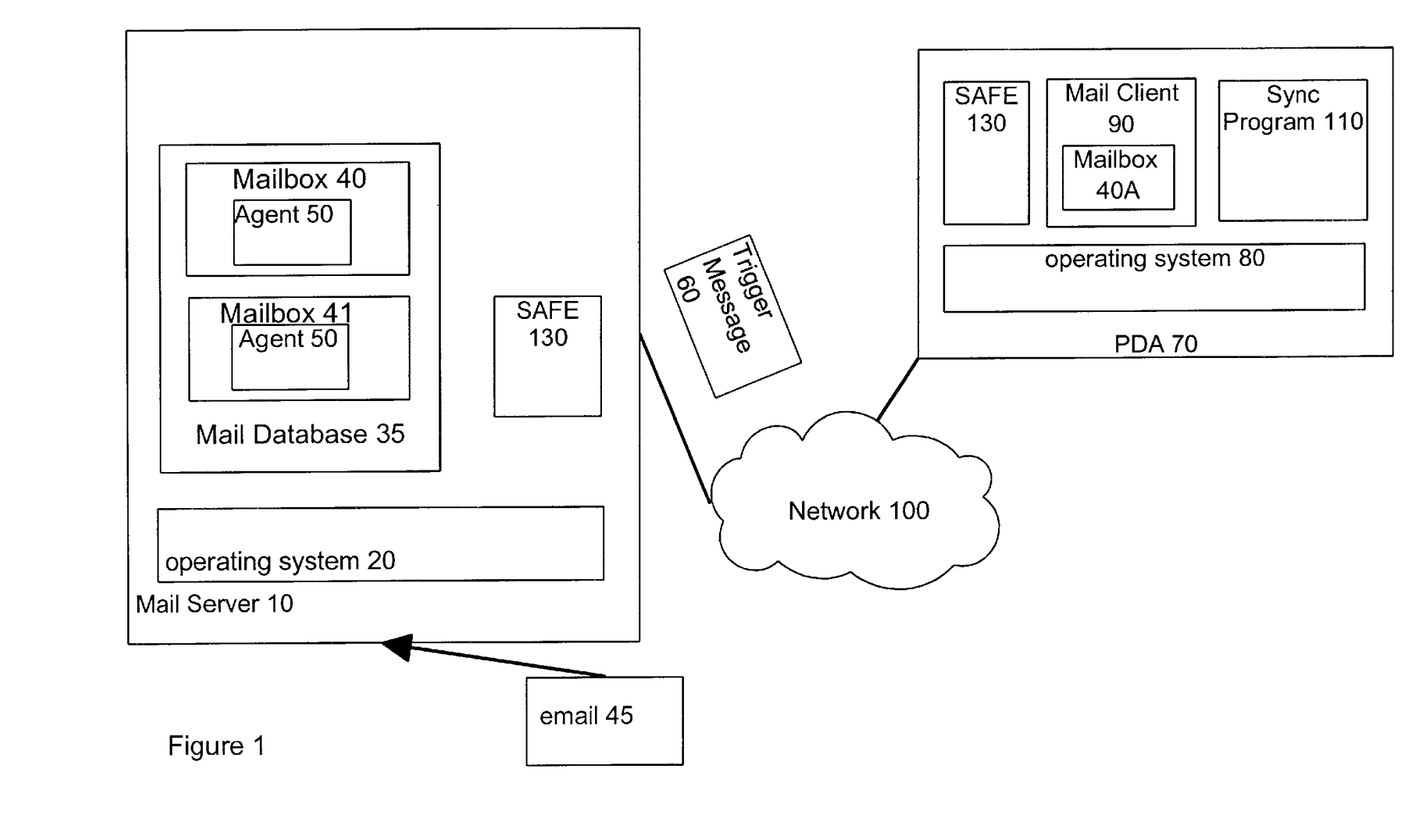
FIG. 1 is a high level diagram of the operating environment of a preferred embodiment of the invention.

With reference to FIG. 1, a server 10, runs an operating system 20. According to the preferred embodiment, the server sits within an enterprise network and can, for example, be from the IBM RISC System/6000 family, running in conjunction with the IBM AIX operating system.

On top of the operating system runs database application software 30. In the example, this is Lotus Notes, available from the IBM Corporation. Within the Lotus Notes environment sits a mail database 35, comprising a plurality of mailboxes (two shown) 40, 41. Each mailbox is associated with a particular user. Upon receipt of an email 45 by server 10, the email 45 is then transferred to the mailbox belonging to the user to whom the email is addressed (in this case mailbox 140).

Each Lotus Notes mailbox is based upon a standard definable template. It is possible to modify the base template definition and any changes are then inherited by all mailboxes. According to the preferred embodiment, the template is such that an agent (small program or macro) is run upon receipt of each mail message, and also includes a mailbox preference to allow a user, owning that box, to complete a field (not shown) indicating a remote mobile computer device. The agent 50 is responsible for creating a trigger message 60 for transmittal across a network 100 to the specified mobile computer device 70. A SAFE application 130 (communications software) also runs on the mail server and the agent passes the trigger message to SAFE which then arranges for the transmittal across the network 100. The network may be, for example, a mobile telephone network or the Public Switched Telephone Network (PSTN) etc, and in one preferred embodiment the mobile computer device is a personal digital assistant (eg a Psion Netbook, available from Psion PLC). Note, the PDA does not have a permanent connection to the server 10.

The PDA also runs a SAFE application 130 to receive the trigger message and an operating system 80, which in the preferred embodiment is EPOC from the Symbian Corporation. The operating system includes a mail client 90, with a mail box 40A. The mail box 40A is the PDA user's copy of the mailbox 40 sitting on the server 10. The PDA also includes mail synchronisation software 110 which when activated dials up the server and performs synchronisation, as will be described in more detail below.

Figure 2:
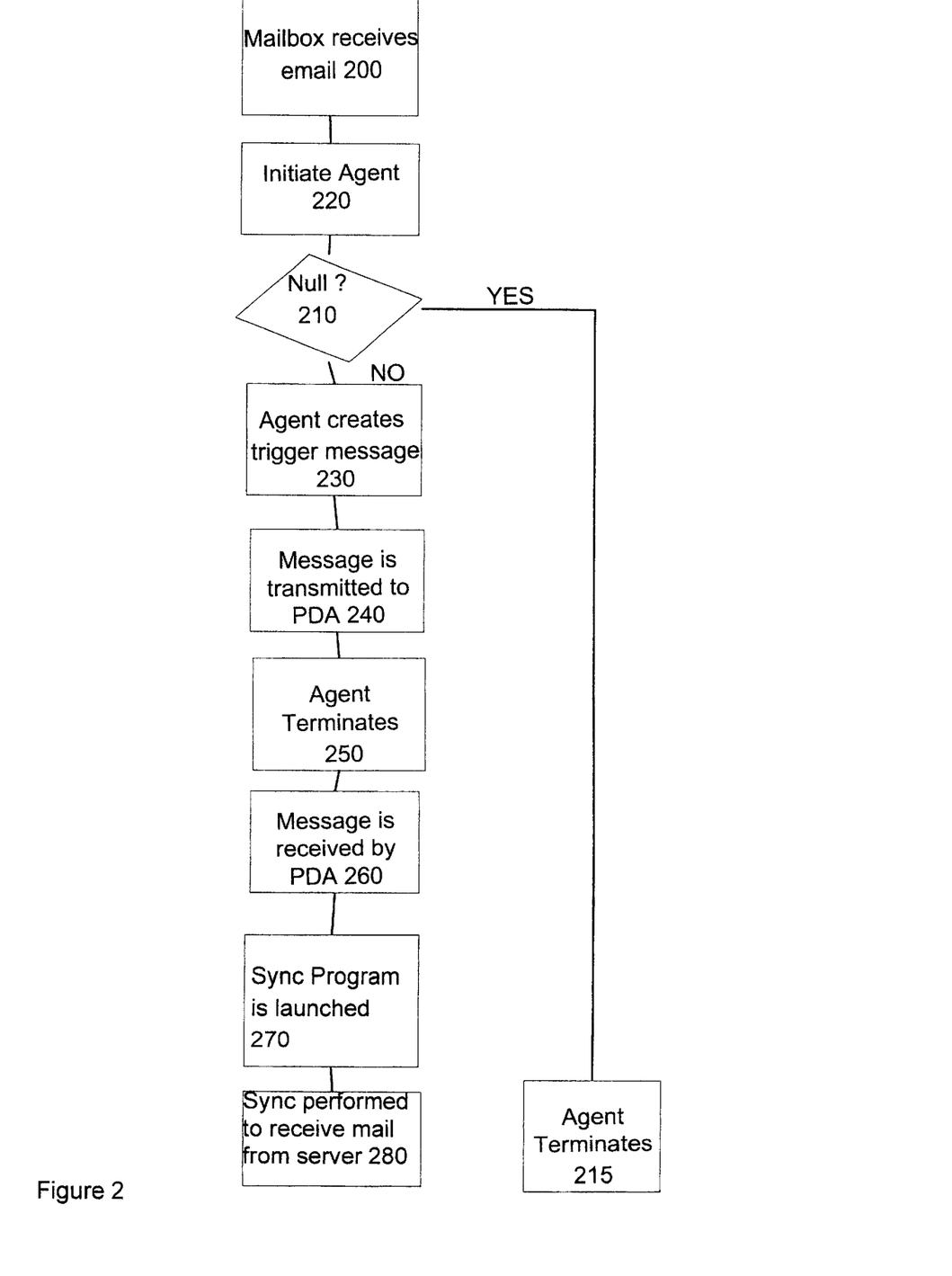
FIG. 2 illustrates at a high level the operation of a preferred embodiment of the present invention.

FIG. 2 illustrates at a high level the operation of the invention according to a preferred embodiment and should be read in conjunction with FIG. 1.

Mailbox 40 receives email 45 (step 200) and this causes the agent 50 to be initiated (step 210). If the remote device field associated with the mailbox 40 is null (ie nothing specified) then the agent terminates (step 215). Otherwise the agent creates a trigger message 60 (step 230) which is transmitted to the corresponding PDA at step 240. The agent then terminates (step 250). The receipt of the trigger message at the PDA (step 260) causes the synchronisation program 110 to launch (step 270) (if not already running). Synchronisation is then performed, resulting in a copy of the mail from the server being received by the client (step 280).

Figure 3A:
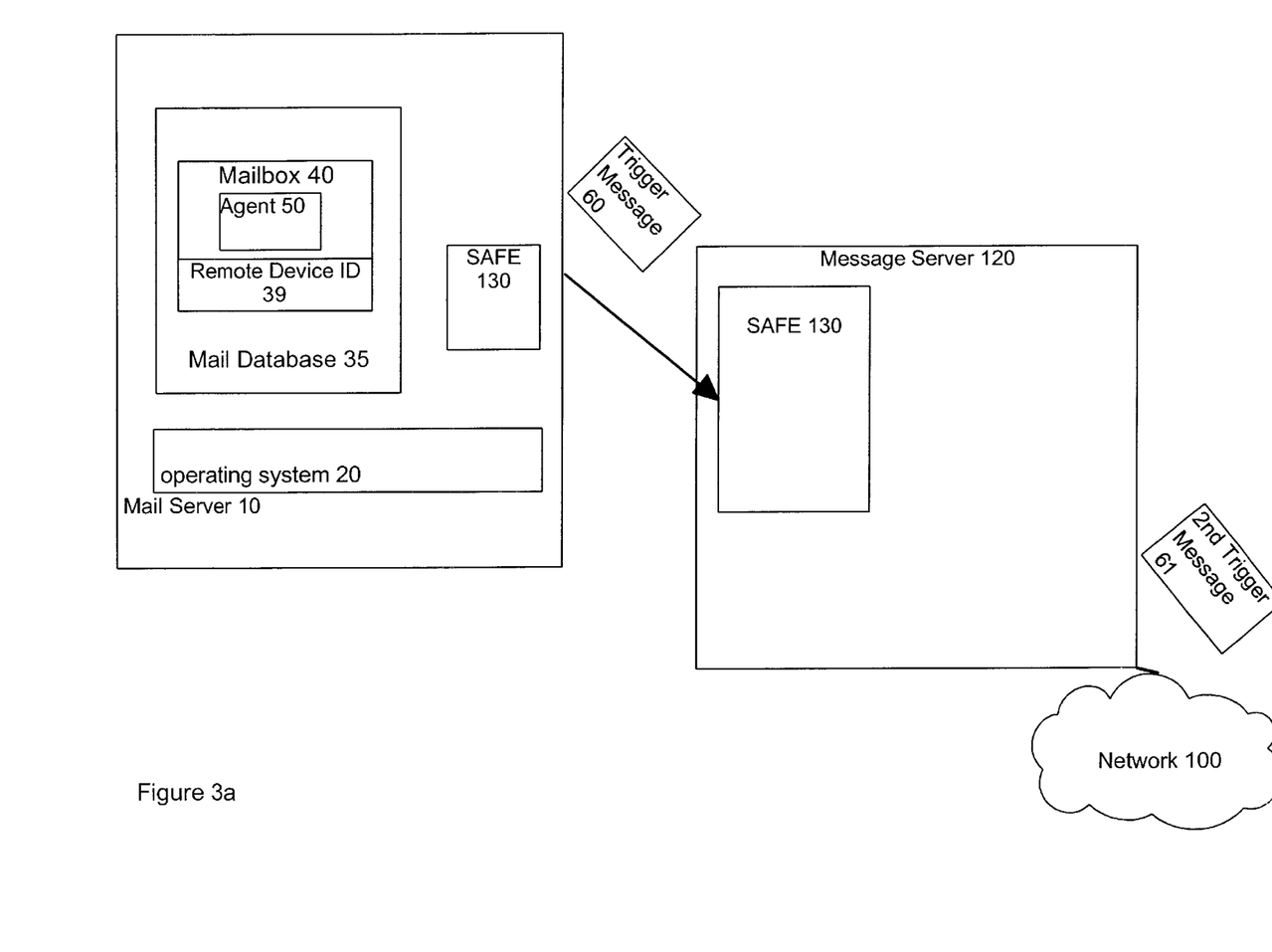
FIG. 3a shows in more detail a preferred embodiment of the server-end of FIG. 1.

FIG. 3a shows in more detail a preferred embodiment of the server-end of FIG. 1. The server is split into two components, a mail server 10 and a message server 120. These may be physically on the same machine or on separate machines with an appropriate network link between them. The mail server 10 has already been described with reference to FIG. 1, however this time the field including a remote device id 39 is also shown for mailbox 40. As previously described, agent 50 is activated upon receipt of an incoming message to mailbox 40, and assuming that remote device id field 39 is not blank, the agent creates and passes, via SAFE, a trigger message 60 to the message server 120. The trigger message includes remote device id 39.

The message server 120 is responsible for routing a second trigger message 61 across network 100 to the PDA corresponding to the user mailbox (shown in FIG. 1). The server 120 also runs a SAFE application 130.

Figure 3B:
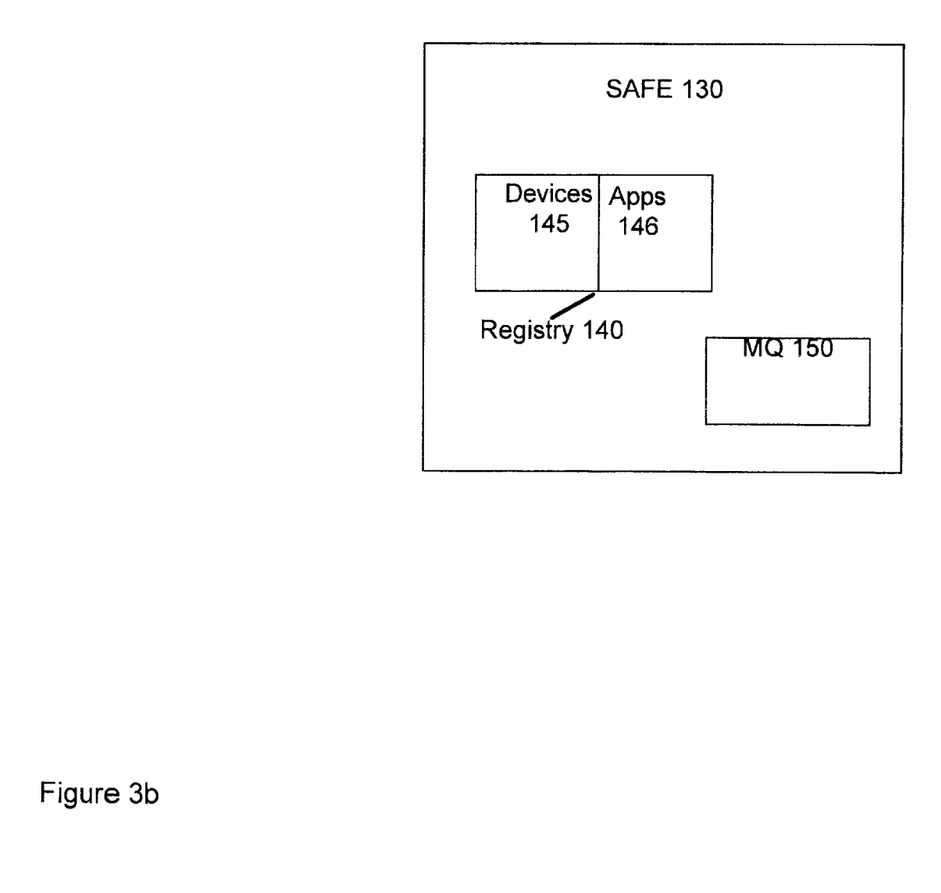
FIG. 3b shows the SAFE application in more detail.

FIG. 3b shows the SAFE application in more detail and should be read in conjunction with FIG. 3a and FIGS. 4 to 6. The SAFE application maintains a registry 140, which stores two sets of data, the first relating to devices and the second relating to applications. When an application is executed on a machine running the SAFE application, it registers itself with the application part 146 of the registry. When an application on a machine requests SAFE to deliver a message, the SAFE application first checks whether it recognises the device to which the message is addressed. If not the message is automatically sent to the SAFE application designated "HOME" which in the present embodiment is SAFE running on the message server. The HOME SAFE application essentially provides a centralised routing facility for SAFE messages from the other systems.

A device (eg a PDA) with network connectivity enabled via, for example, a dialup modem connection can register itself with the devices portion 145 of the HOME registry 140. A PDA user can specify contact details (eg the telephone number of the PDA) as part of a configuration on the remote device (not shown) and then the first time the device dials in to the message server this information is transferred across to the server's registry. This HOME registry maps the PDA's device id to the corresponding contact details. It is also possible using the PDA to remove the device id from the HOME registry 140. SAFE applications running on machines other than the HOME system need only store device information to allow them to contact their HOME system as required.

A message queuing (MQ) application 150 (see FIG. 3b) also runs within SAFE on the message server 120 and according to the preferred embodiment this is the MQ Series application, available from the IBM Corporation. The MQ application provides reliable delivery of messages from a SAFE application on one machine to a SAFE application on another machine. When a message is transmitted using the MQ application, a copy of it sits on a queue (not shown) until confirmation of receipt is received from the device to which it has been sent. The application therefore ensures reliable delivery of messages. Furthermore the MQ application may also have encryption and compression capabilities etc.

Figure 4:
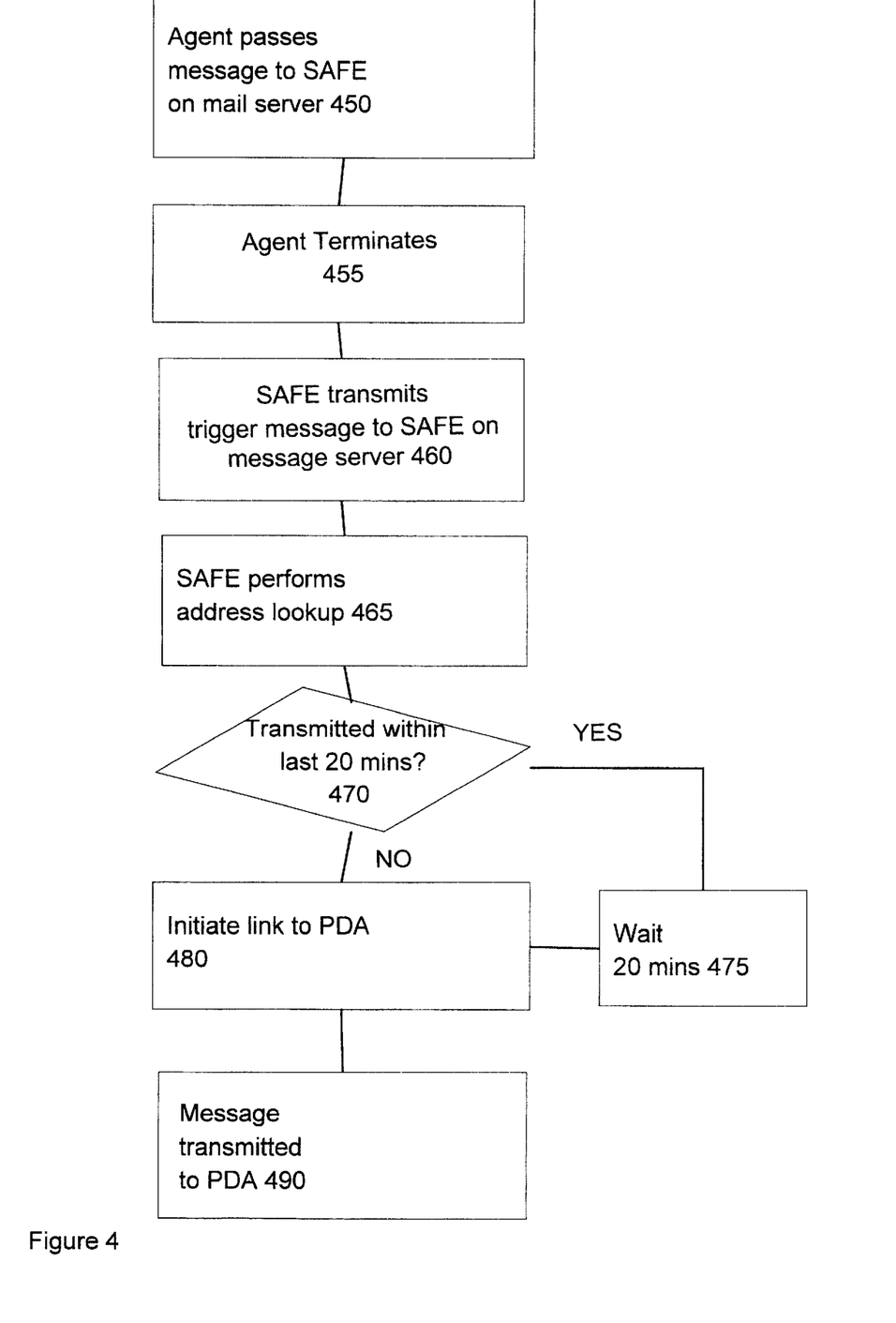
FIG. 4 depicts the operation at the server-end of FIG. 3a according to one embodiment of the present invention.

The operation at the server-end of FIG. 3a is shown in FIG. 4, according to one embodiment of the present invention, which should be read in conjunction with FIGS. 3a and 3b.

Agent 50 passes the trigger message 60 including the remote device id to the SAFE application 130, running on the mail server (step 450) and then terminates at step 455. SAFE determines that it is not the device to which the message is addressed and therefore transmits the trigger message 60 to the HOME SAFE application 130 running on the message server 120 (step 460). Note, the trigger message contains a request to perform mail synchronisation. The HOME SAFE application 130, looks up the address (ie typically a telephone number) of the device id in the devices portion 145 of the HOME registry 140 (step 470). A timer also runs on the message server (not shown in FIG. 3a). This is used at step 470 to check when the message server last called the remote computing device. According to the preferred embodiment, if it did so within a configurable time period, then the message server waits until the expiry of such time period (step 475) before initiating a link at step 480 with the PDA. Note, this setting can be performed in similar fashion to the configuration of the device ID described earlier and in the example the aforementioned time period is 20 minutes.

Otherwise, a link is initiated immediately. This link is based on the contact information retrieved from the HOME registry at step 465. Note, if the device id is not found then this can be logged and the whole process terminated.

Thus, the PDA device can send messages to the server 10 in order to update the device id 39 and timer setting. The PDA transmits such a message by dialling into the server. As previously mentioned, it can also disable the service altogether by transmitting a null device id 39.

In order to initiate the link, a second trigger message containing the keyword "SAFE" is transmitted to the SAFE application 130, running on the PDA. As described in more detail below, the initial link is then dropped and a second link formed from the PDA back to the message server. This allows a second connection to be formed between the SAFE applications running on both the message server and the PDA. The message server then uses the MQ application to transmit the synchronisation request, via the SAFE application, to the PDA at step 490.

The reason for this approach is that as described in more detail below, communications capabilities are limited on a PDA. In particular, the PDA can only setup TCP/IP communications as used by MQ for outbound calls. In contrast, for inbound calls only a simple serial protocol is supported. Therefore the MQ application is not actually used for initial delivery of the second trigger message from the message server to the PDA. Rather, this is transmitted to the PDA by the SAFE application itself using the basic serial protocol. Since the second trigger message contains simply the keyword "SAFE", and given the further processing described below, the absence of complete reliability in terms of delivery of the second trigger message is not significant.

Figure 5:
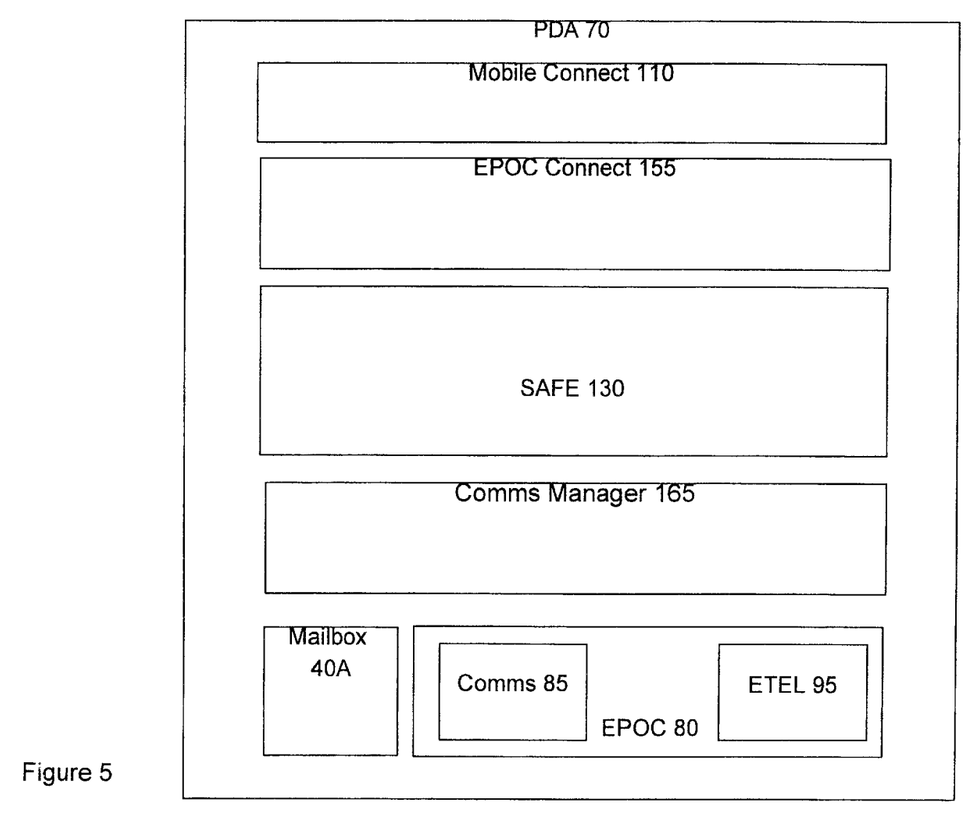
FIG. 5 is a component diagram of the software running on a personal digital assistant (PDA) in accordance with a preferred embodiment of the present invention.

FIG. 5 is a component diagram of the software running on a PDA 70 in accordance with a preferred embodiment of the present invention. The PDA runs the EPOC operating system 80 which includes an ETEL component 95. The ETEL software is responsible for detecting an incoming call, for answering it, and for determining whether the call is voice, FAX, or data.

Also within the operating system sits Comms software 85. When an incoming call from the message server is received responsive to step 480 in FIG. 4, this establishes a serial data connection between the Comms software and the HOME SAFE application. The Comms software is responsible for receiving data over this connection including the second trigger message, which it then passes to Comms Manager 165. Comms Manager identifies the second trigger message by means of the keyword "SAFE" and notifies a SAFE application 130, running on the PDA. The call is then dropped and the SAFE application initiates a second call back to the HOME SAFE application on the message server. Because this is an outbound call, the SAFE applications can now set up a TCP/IP link and talk to each other using MQ.

The PDA also runs mail software for receiving, sending, working with emails etc (shown in FIG. 1). This is provided with the operating system 80 and includes mailbox 40A. Given the resource constraints on PDA 70, it does not make sense to also install a separate mail program to act as a client to the mail server database 35, complete with local mailbox replica. Rather, the PDA includes the Mobile Connect application, available from the IBM Corporation, which allows the operating system mailbox 40A on PDA 70 to effectively function as a replica of mailbox 40 on mail server 10. Thus Mobile Connect can be used to perform "synchronisation" between mailbox 40A on PDA 70 and mailbox 40, in which case Mobile Connect performs any necessary format conversion, as well as truncating mail from the server if it exceeds a predetermined size due to storage limitations on PDA 70. In this manner mailbox 40A on PDA 70 appears to the user as a local replica of mailbox 40 on mail server 10.

Once the second connection has been established, the message server sends a synchronisation request to the PDA. This is then passed to Comms Manager which notifies the SAFE application, running on the PDA. The SAFE application 130 again includes a MQ application and a registry (as shown in FIG. 3b). The SAFE application verifies, via its registry, whether a Mobile Connect (MC) program 110 is running and if not it launches this program.

Once it is confirmed that the Mobile Client is running or has been launched, the SAFE application notifies the incoming message to EPOC Connect, which in turn causes EPOC Connect to pass a command to Mobile Connect prompting it to set up a communications link with the mail server in order to perform mail database synchronisation. Such synchronisation is part of the standard known operation of Mobile Connect and accordingly will not be described further here. Note, EPOC Connect and Comms Manager are essentially part of the overall SAFE application but are platform dependent, and so are separate processes in order to allow the main SAFE application 130 to retain platform independence.

Figure 6:
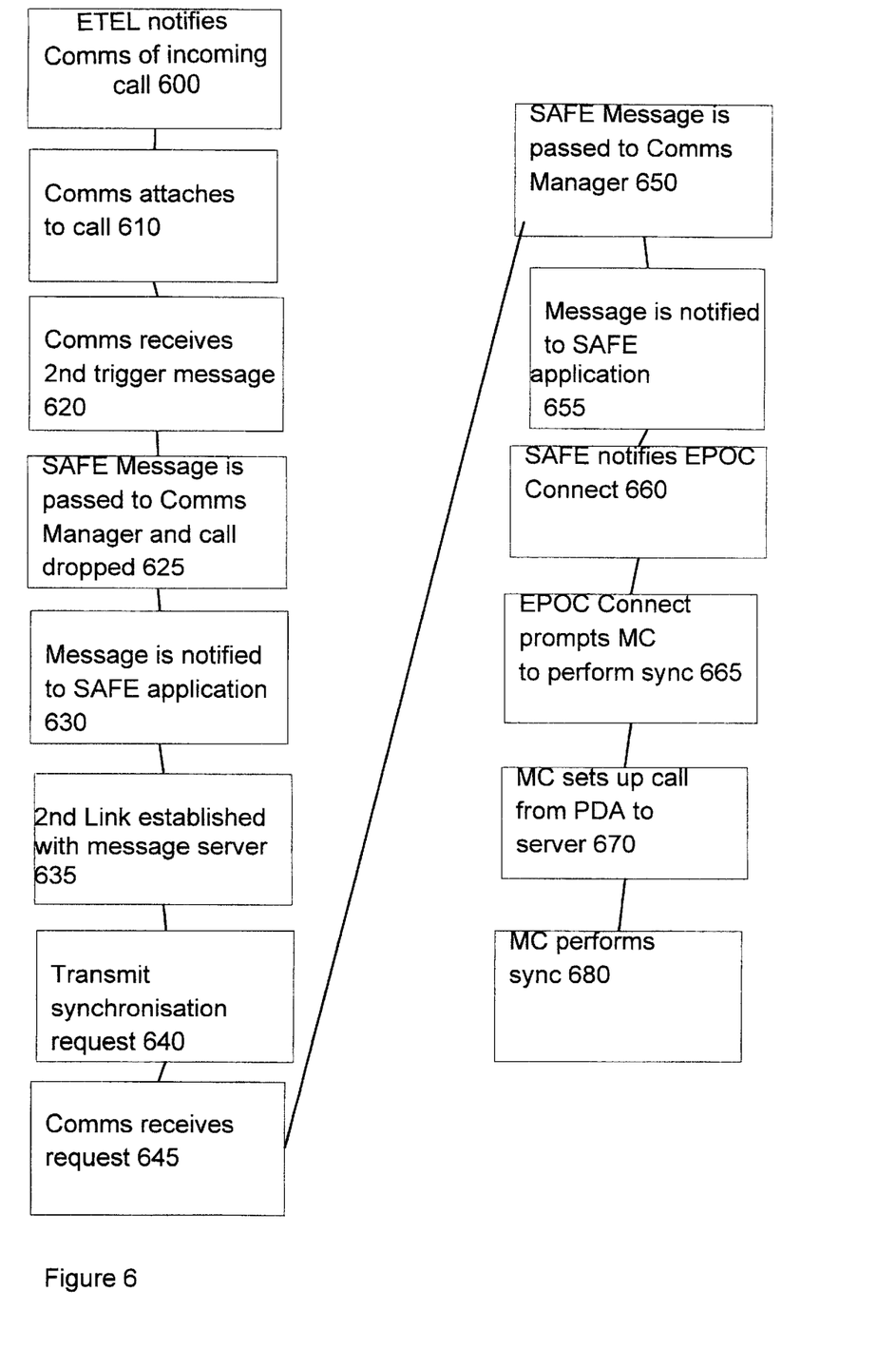
FIG. 6 illustrates the operation of the PDA upon receipt of a second trigger message.

FIG. 6 illustrates the operation of the PDA upon receipt of the second trigger message (corresponding essentially to steps 260–280 in FIG. 2). According to the preferred embodiment, the message server initiates a call to the PDA 70. ETEL 95 detects an incoming call (not shown) and if this is a data call (as opposed to voice or FAX) it notifies Comms 85 (step 600). Comms then attaches to the call (step 610) and is then responsible for receiving the "SAFE" second trigger message (step 620). The second trigger message is then passed to Comms Manager 165 which identifies the "SAFE" keyword and the call is dropped (step 625). Note, if the second trigger message is not received within a given period of time then the call is also dropped.

The Comms Manager then notifies the SAFE application that the second trigger message has been received (step 630), and SAFE initiates a second call to the message server to establish a second link (step 635). The original synchronisation request from the mail database is then transmitted by the message server to the PDA (this time using the MQ application) over this second link (step 640). The Comms software receives this (step 645) and passes it to Comms Manager (step 650). The message is notified to the SAFE application (step 655) which checks whether Mobile Connect is running using its registry and if not Mobile Connect is launched. SAFE then passes a command to EPOC Connect at step 660, which prompts it to request Mobile Connect to perform mail database synchronisation at step 665. Mobile Connect sets up a call from the PDA to the server 10 (step 670) and completes the synchronisation process in known fashion (step 680). The overall outcome of this is that the new message that arrived in user mailbox 40 on the mail server has now been transferred to the local copy of the mailbox on PDA 70.

Figure 7:
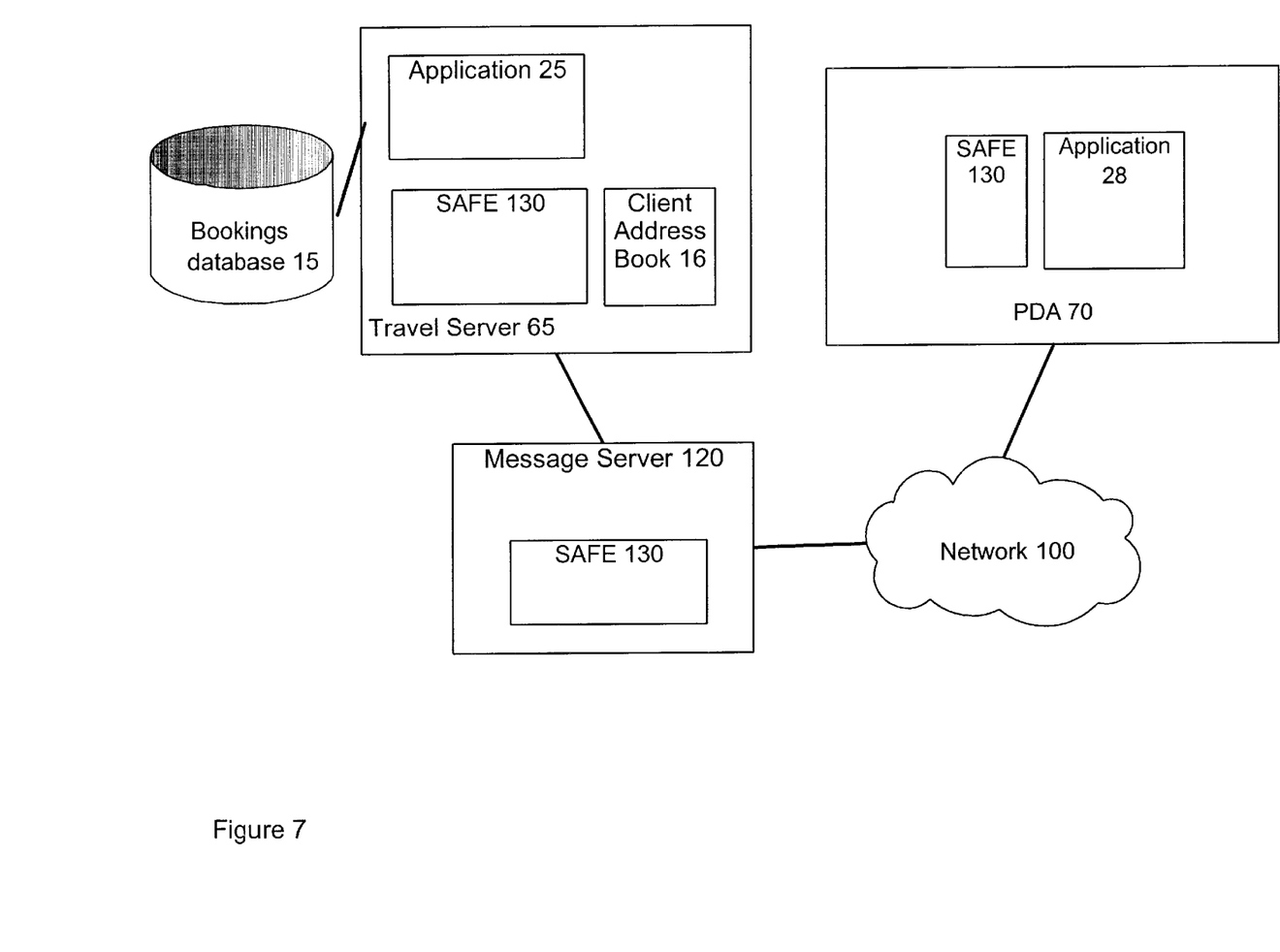
FIG. 7 shows the operation of a travel booking service according to an alternative preferred embodiment of the invention.

FIG. 7 shows the operation of a travel booking service according to an alternative preferred embodiment. The service utilises a travel server 65. The travel server runs a travel application 25 and the SAFE application 130 (communications software). The travel server also includes a client address book 16. Bookings may be made over the phone or via a PDA 70 with the travel server 65. In either case, details of the booking are stored in a bookings database 15. Once such a booking has been made, the travel agent then typically awaits a response from one or more third party suppliers before it provides the client with confirmation. For example, the agent may need to know whether the chosen hotel has the required number of rooms available and whether the airport has seats free on a suitable flight.

When a client's provisional booking is stored in database 15, a client identifier is also stored. This identifier maps to a client profile (eg name, address, etc), including a remote mobile device id, contained within the client address book 16 on the travel server 65. The remote device id corresponds to that of the PDA.

When the third party suppliers have confirmed their acceptance of the relevant part of the booking, this is entered into the bookings database 15. This causes application 25 on the travel server to retrieve the client's booking information, and it then accesses the client's profile to retrieve the relevant contact details from the client address book. (It will be appreciated that the operation of the travel centre as described hereto is known, and many variations on this processing are known).

In any event, the server now requires to send confirmation of the booking to the client, using the contact details from the client profile. This could be done in a number of ways, for example by setting up a phone call to the client, or by transmitting an email. The focus of the present invention is on confirmation being transmitted from the server to the PDA using the appropriate remote device id from the client address book. (It will be appreciated that the server may provide confirmation to the PDA in parallel with other forms of confirmation, eg by telephone; this may be dependent on the profile for any particular client, time of day, or any other pertinent factor).

Thus application 25 passes a request to the SAFE application on server 65, specifying the remote device id, and the destination application (application 28 on PDA 70; possibly a small travel client, or perhaps simply an email client). As previously described, SAFE then operates to create a first trigger message including the relevant device id, which is transmitted via the SAFE application 130, running on the travel server, to a message server 120. The message server runs the SAFE application designated "HOME" and this comprises a registry (see FIG. 3b) with each device id having corresponding contact information. The HOME SAFE application uses this registry to determine how to contact the PDA 70.

The PDA also runs a SAFE application 130 and the ensuing processing is analogous to that described above in relation to the mailbox synchronisation. Thus Message server 120 initiates a call to PDA 70 and transmits a second trigger message to the PDA. This is received by SAFE at the PDA using the serial link protocol, and once the presence of the "SAFE" keyword has been confirmed, this first call is then dropped. SAFE then initiates a link with the HOME SAFE application, which this time as an outbound connection from the PDA can use TCP/IP. The HOME SAFE application then uses this second link to send the confirmation to SAFE running on the PDA. Depending on implementation details, this confirmation may directly contain all the necessary travel information itself, or it may trigger the PDA to contact the travel server itself in order to receive the confirmation information (this latter arrangement would then be somewhat similar to the mailbox synchronisation process described above).

The skilled person will be aware that many variations and enhancements to the above processing are possible, of which an exemplary selection will now be described.

Although the preferred embodiment has been described in terms of two separate servers (ie a mail or travel server and a message server), this configuration is for convenience only. In an alternative embodiment the functionality of the message server may be included directly in the mail or travel server. For example, the agent program of the mail database may itself directly set up the link to the PDA, without using the message server as an intermediary. The advantage of the preferred embodiment however is that the message server in fact provides a generic mechanism for contacting the PDA which can then be used for a wide range of tasks from multiple different servers. In other words, the same message server may simultaneously support both a mail server as in FIG. 3a, and also a travel server as in FIG. 7.

It will be appreciated that additional information could be incorporated into or inferred from the arrival of the second trigger message at the client. For example, the client might directly initiate mailbox synchronisation on receipt of such a trigger message. However the two-stage process described above firstly avoids sending important information over a typically primitive, unreliable and insecure comms facility (such as the serial link), and secondly it permits greater flexibility. In particular, the PDA's first response to the second trigger message is to see if there are any SAFE messages waiting for it at the HOME SAFE server, and it is the delivery and processing of these messages which are used to provide information to the PDA (eg to command a mailbox synchronisation, or to confirm a travel booking).

Although the preferred embodiment uses a specific keyword in the trigger message to prompt the outbound call from the PDA to the server, there are many other possibilities, such as using caller id from the server. Thus if the number of a known server is recognised with respect to an incoming call, then this could directly trigger the return call from the client to the server (and potentially also the mailbox synchronisation), irrespective of whether the initial call is actually answered at the PDA. Alternatively, the server might use an SMS message to the PDA as the trigger message. This has the added advantage that such a message will be queued if the PDA is switched off for future delivery. It will be appreciated that both of these approaches are possible independent of whether the mail or travel server contacts the PDA directly, or whether the message server is used as an intermediary. Note however that the communication with the client via a basic serial protocol as in the preferred embodiment implies the solution is not limited to a specific infrastructure, unlike GSM SMS messages or caller id in most situations, and so can work internationally.

What is claimed is:

1. A method for establishing a server initiated high-level protocol communications session between a server and a client on a mobile computing device, wherein said mobile computing device supports a low-level protocol for both inbound and outbound calls, and a high-level protocol for outbound calls only, said method comprising the steps of:
   initiating a first call from said server to said client using the low-level protocol;
   responsive to detecting said first call at the client, Initiating a second call from said client to said server using the high-level protocol;
   responsive to receiving the second call at the server, establishing said high-level protocol communications session; and
   using the high-level protocol communications session for receiving data at the client from the server.

2. The method of claim 1, wherein the low-level protocol is a serial protocol.

3. The method of claim 1, wherein the low-level protocol is SMS messaging.

4. The method of claim 1, wherein the low-level protocol provides the caller id of the server to the client.

5. The method of claim 1, wherein the high-level protocol is TCP/IP.

6. The method of claim 1, wherein an operating system running on the client provides the support for said low-level and high-level protocols.

7. The method of claim 1, further comprising the steps of:
   storing at the server details of protocols supported by the client; and
   responsive to a client supporting said high-level protocol for inbound calls, initiating a call directly with said client using said high-level protocol.

8. The method of claim 1, wherein the client is a personal digital assistant.

9. The method of claim 1, further comprising the step of dropping said first call before initiating said second call.

10. The method of claim 1, wherein said step of detecting said first call includes detecting predetermined information within said first call.

11. A server for initiating a high-level protocol communications session with a client on a mobile computing device, wherein said mobile computing device supports a low-level protocol for both inbound and outbound calls, and a high-level protocol for outbound calls only, comprising:
   means for initiating a first call to the client using the low-level protocol;
   means for receiving a second call from the client, wherein the initiation of said second call by the client is responsive to detecting said first call at the client and wherein the second call uses the high-level protocol;
   means, responsive to receipt of said second call, for establishing said communications session, with the client using said high-level protocol; and
   means for using the high-level communications Protocol session to send data to the client.

12. The server of claim 11, wherein the low-level protocol is a serial protocol.

13. The server of claim 11, wherein the low-level protocol is SMS messaging.

14. The server of claim 11, wherein the low-level protocol provides the caller id of the server to the client.

15. The server of claim 11, wherein the high-level protocol is TCP/IP.

16. The server of claim 11, further comprising:
   means for storing details of protocols supported by the client; and
   means, responsive to a client supporting said high-level protocol for inbound calls, for initiating a call directly with said client using said high-level protocol.

17. A mobile computing device client for receiving data from a server via a high-level protocol communications session, wherein said device supports a low-level protocol for both inbound and outbound calls, and a high-level protocol for outbound calls only, said device comprising:
   means for receiving a first call from the server using the low-level protocol;

means, responsive to receiving said first call, for initiating a second call to the server using the high-level protocol;

means for establishing said communications session with the server using said high-level protocol; and means for using the high-level protocol communications session for receiving data at the client from the server.

18. The mobile computing device client of claim 17, wherein the low-level protocol is a serial protocol.

19. The mobile computing device client of claim 17, wherein the low-level protocol is SMS messaging.

20. The mobile computing device client of claim 17, wherein the low-level protocol provides the caller id of the server to the client.

21. The mobile computing device client of claim 17, wherein the high-level protocol is TCP/IP.

22. The mobile computing device client of claim 17, wherein an operating system running on the client provides the support for said low-level and high-level protocols.

23. The mobile computing device of claim 17, wherein the dient is a personal digital assistant.

24. The mobile computing device of claim 17, further comprising means for dropping said first call before initiating said second call.

25. The mobile computing device of claim 17, wherein said means for receiving said first call includes means for detecting predetermined information within said first call.

26. A method for establishing a server initiated high-level protocol communications session between a server and a client on a mobile computing device, wherein said mobile computing device supports a low-level protocol for both inbound and outbound calls, and a high-level protocol for outbound calls only, said method comprising the steps of:

initiating a first call from said server to said client using the low-level protocol;

responsive to detecting said first call at the client, initiating a second call from said client to said server using the high-level protocol;

responsive to receiving the second call at the server, establishing said high-level protocol communications session; and using the high-level protocol communications session to synchronise a mailbox at the client with a mailbox at the server.

27. A server for initiating a high-level protocol communications session with a client on a mobile computing device, wherein said mobile computing device supports a low-level protocol for both Inbound and outbound calls, and a high-level protocol for outbound calls only, comprising;

a client mailbox;

means for initiating a first call to the client using the low-level protocol;

means for receiving a second call from the client using the high level protocol, wherein initiation of said second call by the client is responsive to detecting said first call at the client;

means, responsive to receipt of said second call, for establishing said communications session, with the client using said high-level protocol; and means for using the high-level protocol communications session to synchronise a mailbox at the client with the client mailbox at the server.

28. A mobile computing device client for receiving data from a server via a high-level protocol communications session, wherein said device supports a low-level protocol for both inbound and outbound calls, and a high-level protocol for outbound calls only, said device comprising:

a mailbox;

means for receiving a first call initiated by the server and using the low-level protocol;

means, responsive to receiving said first call, for initiating a second call to the server using the high-level protocol;

means for establishing said communications session with the server using said high-level protocol;

means for using the high-level protocol communications session to synchronise the mailbox with a mailbox at the server.

* * * * *